(12) United States Patent  (10) Patent No.: US 6,549,394 B1
Williams  (45) Date of Patent: Apr. 15, 2003

(54) MICROMACHINED PARALLEL-PLATE VARIABLE CAPACITOR WITH PLATE SUSPENSION

(75) Inventor: Kirt Reed Williams, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/104,349

(22) Filed: Mar. 22, 2002

(51) Int. Cl.$^7$ .................................................. H01G 7/06
(52) U.S. Cl. ....................... 361/281; 361/283; 361/292; 361/290; 361/296; 361/297
(58) Field of Search ................................ 361/517, 519, 361/509, 277, 278, 283.3, 292, 299.1, 303, 304, 270, 281, 290, 296, 297

(56) References Cited

U.S. PATENT DOCUMENTS

| | | | | |
|---|---|---|---|---|
| 5,008,774 A | * | 4/1991 | Bullis et al. | |
| 5,103,283 A | * | 4/1992 | Hite | |
| 5,696,662 A | * | 12/1997 | Bauhahn | |
| 6,022,772 A | * | 2/2000 | Watanebe et al. | |
| 6,242,989 B1 | * | 6/2001 | Barber et al. | |
| 6,248,018 B1 | * | 6/2001 | Kehlstadt et al. | |
| 6,404,614 B1 | * | 6/2002 | Zhu et al. | |

* cited by examiner

Primary Examiner—Chau N. Nguyen
Assistant Examiner—Nguyen Ha (57) ABSTRACT

A capacitor having a bottom plate, a top plate and a support connected to the center portion of the top plate for positioning the top plate over the bottom plate and separated therefrom by a gap. The outer portion of the top plate moves relative to the bottom plate when a potential is applied between the plates. The outer portion may be connected to the center portion of the top plate by springs such that the movement of the top plate relative to the bottom plate is accommodated by bending at least one of the springs. The capacitor may also include an insulating layer between the top and bottom plates disposed so as to prevent the top plate from shorting to the bottom plate. A spacer for setting the minimum distance between the outer portion of the top plate and the bottom plate may also be included.

9 Claims, 7 Drawing Sheets

MICROMACHINED PARALLEL-PLATE VARIABLE CAPACITOR WITH PLATE SUSPENSION

FIELD OF THE INVENTION

The present invention relates to capacitors for use in electrical circuits and the like, and more particularly, to a variable capacitor that is adapted for fabrication using micromachining.

BACKGROUND OF THE INVENTION

Parallel plate capacitors having a capacitance that depends on the potential difference between the plates are well known in the electrical arts. The devices typically consist of a fixed bottom plate and a movable top plate that is held over the bottom plate with the aid of a number of springs. As the potential difference between the plates is increased, the top plate is pulled toward the bottom plate by the electrostatic forces against the restoring forces provided by the spring system. Variable capacitors of this type are described in Darrin J. Young and Bernhard E. Boser, "A Micromachined Variable Capacitor for Monolithic Low-Noise VCOs," Technical Digest of Solid-State Sensor and Actuator Workshop, 1996, pp. 86–89 and in Aleksander Dec and Ken Suyama, "Micromachined Electro-Mechanically Tunable Capacitors and Their Applications to RF IC's," IEEE Transactions on Microwave Theory and Techniques, vol. 46, no. 12, Part 2, December 1998, pp. 2587–2596.

The usefulness of such variable capacitors in mass-produced electronics depends on the reproducibility of the capacitors, particularly the voltage versus capacitance function provided by each capacitor. In particular, the spring forces provided by the suspension springs must be repeatable from device to device. This, in turn, requires that the stress in the springs in the absence of an applied voltage be repeatable and, for a given voltage, be repeatable during operation. Here, it should be noted that a tensile or compressive stress on the springs makes the effective spring constant higher or lower, respectively, and hence, alters the capacitance as a function of voltage curve.

The top plate is typically constructed from a conducting film that is deposited using conventional integrated circuit fabrication techniques. Stress in this film can translate into stress in the springs if the film cannot change size to relieve the stress. As a practical matter, stress in the film or films that form the top capacitor plate is very difficult to control for a number of reasons. First, during fabrication, there is normally residual stress in the film or films that make up the top plate and spring. Second, during packaging, the die-attachment material applies stress to the bottom of the substrate.

Finally, during operation, the temperature varies. The substrate (e.g., silicon or glass) and the package usually do not have the same thermal expansion rate as the films that make up the top plate. Hence, a change in temperature results in a variable stress in the plate-spring structure. Consider a prior art capacitor such as those discussed in the above-cited references in which the top plate and springs are made of metal with a relatively large thermal coefficient of expansion (TCE), and the substrate is made of silicon or glass with a relatively low TCE. If a voltage has been applied to the capacitor, as the temperature falls the plate and spring shrink faster than the substrate, increasing the tension, pulling the plates apart, decreasing the capacitance.

In principle, the problems caused by temperature fluctuations can be reduced by using the same material for the top plate as is used for the underlying substrate, and hence, reduce the mismatch in TCE between the two structures. However, for micromachined devices, this practically limits the material to silicon, as other materials have not historically been used for both the substrate and plate/spring. Unfortunately, silicon has a much higher resistivity than metals, and hence, such capacitors are poorly suited for capacitors in high-frequency applications.

Broadly, it is the object of the present invention to provide an improved micromachinable variable capacitor.

These and other objects of the present invention will become apparent to those skilled in the art from the following detailed description of the invention and the accompanying drawings.

SUMMARY OF THE INVENTION

The present invention is a capacitor having a bottom plate, a top plate and a support connected to the center portion of the top plate for positioning the top plate over the bottom plate and separated therefrom by a gap. The outer portion of the top plate moves relative to the bottom plate when a potential is applied between the top and bottom plates. The outer portion of the top plate may be connected to the central portion of the top plate by a plurality of springs such that the movement of the top plate relative to the bottom plate is accommodated by bending at least one of the springs. The capacitor may also include an insulating layer between the top and bottom plates disposed so as to prevent the top plate from shorting to the bottom plate. In addition, a spacer for setting the minimum distance between the outer portion of the top plate and the bottom plate may also be included. In one embodiment of the invention, the springs are shaped to relieve thermal stress between the outer portion of the top plate and the center portion of the top plate.

DETAILED DESCRIPTION OF THE INVENTION

Figure 1:
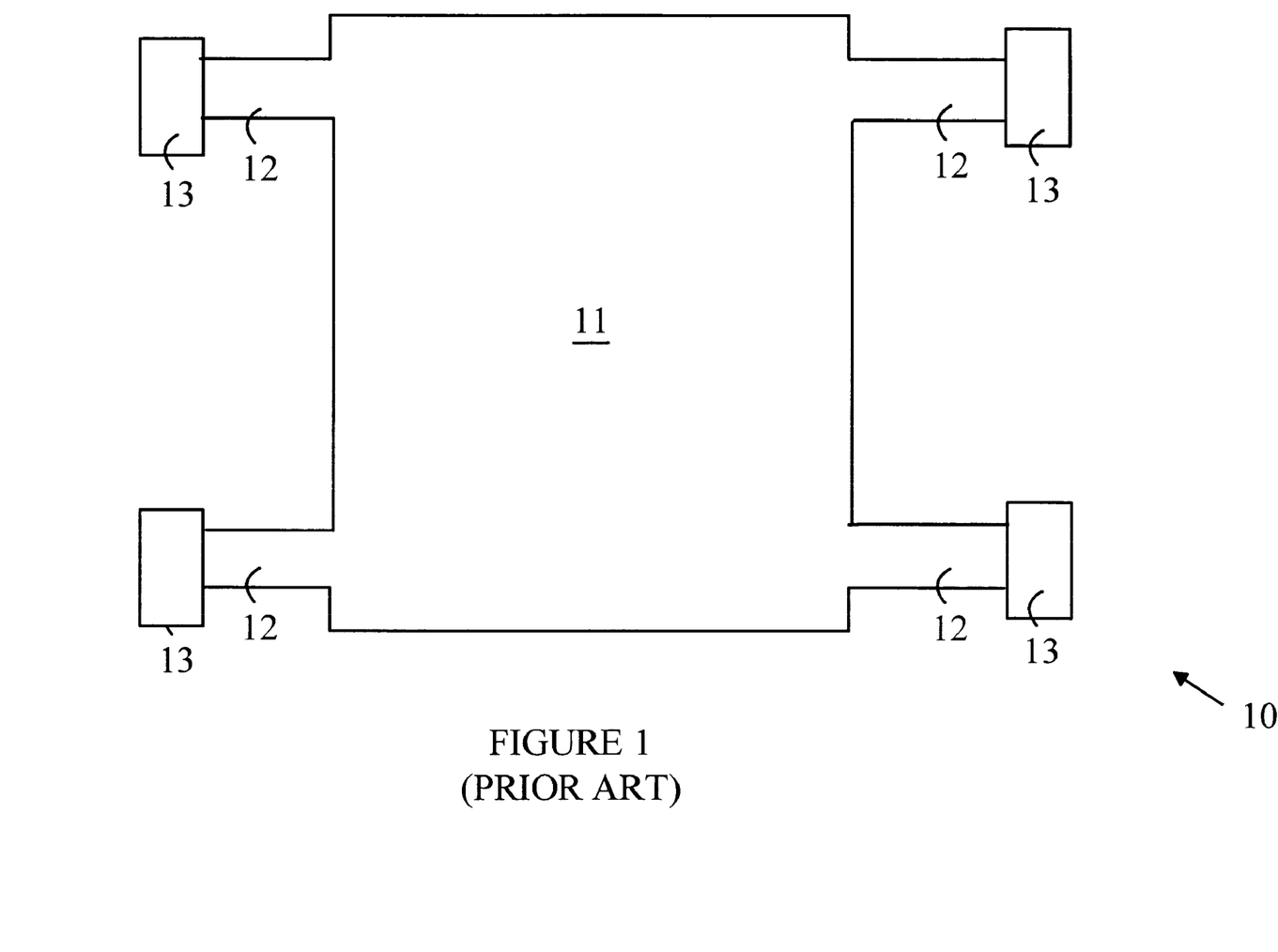
FIG. 1 is a top view of a typical prior art variable capacitor 10.

The manner in which the present invention obtains its benefits can be more easily understood with reference to FIG. 1, which is a top view of a typical prior art variable capacitor 10. Variable capacitor 10 has a top plate 11 that is suspended by springs 12. Each spring is attached to a support 13 at one end and plate 11 at the other end. The supports are also attached to the underlying substrate. If the substrate has a different rate of thermal expansion from that of the support, temperature changes will induce stresses in the springs. If the size of top plate 11 tries to increase relative to the spacing of the supports, it can be seen that the springs will be compressed. Similarly, if the size of the top plate tries to decrease relative to the spacing of the supports, the springs will be stretched. As noted above, such stretching or compression alters the effective spring constant, and hence, changes the amount of displacement that is obtained for a given applied voltage.

It should also be noted that an increase in the plate size can lead to the top plate buckling if the springs cannot take up the increase by compressing. A plate that is no longer flat also has an altered capacitance versus applied voltage characteristic curve, and hence, is undesirable.

The present invention is based on the observation that the prior art devices suspend the top plate at its periphery using multiple supports, and hence, any changes in the size of the top plate relative to the support placing gives rise to a stress that must be taken up either by the top plate or the springs. The present invention avoids these problems by utilizing an arrangement in which the top plate is supported substantially at its center by springs that are attached to a support, and hence, the top plate is free to expand or contract with changes in temperature. In addition, the present invention is much less sensitive to stresses induced in the fabrication processes, since using the single center support prevents such stresses from changing the size of the top plate. In addition, stresses that alter the size of the top plate do not induce stresses in the springs.

Figure 2:
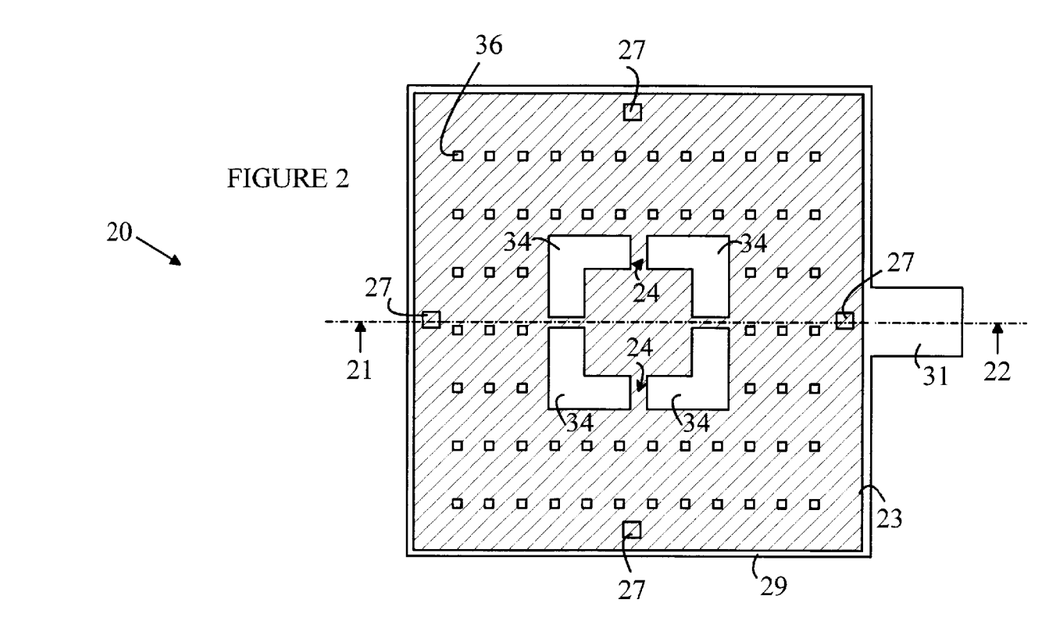
FIG. 2 is a top view of a capacitor 20.
Figure 3:
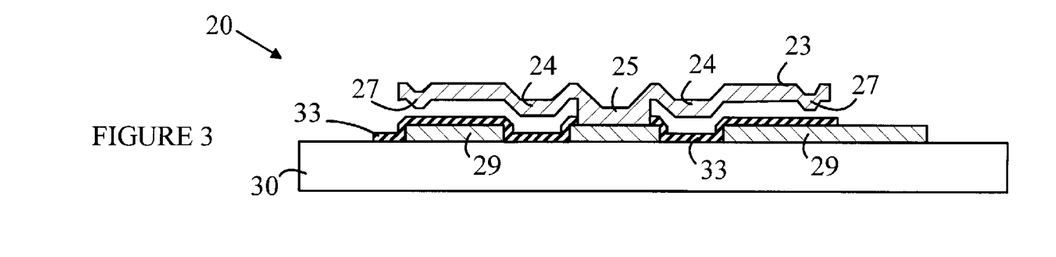
FIG. 3 is a cross-sectional view of capacitor 20 taken through line 21–22.

Refer now to FIGS. 2 and 3, which illustrate a micromachined capacitor 20 according to the present invention. FIG. 2 is a top view of capacitor 20. FIG. 3 is a cross-sectional view of capacitor 20 taken through line 21–22. Capacitor 20 is constructed on a substrate 30 on which a bottom plate 29 has been deposited. The top plate 23 is connected substantially at its center to a support 25 by springs 24. In the preferred embodiment of the present invention, a protrusion 27 is provided in the top plate. Protrusion 27 sets the maximum displacement of top plate 23. An insulating layer 33 prevents shorts between top plate 23 and bottom plate 29 when the top plate moves downward. It should be noted that in many designs, the center support 25 is sufficiently large to act as a bond pad for the top plate. A bond pad for the bottom plate is shown at 31.

Figure 4:
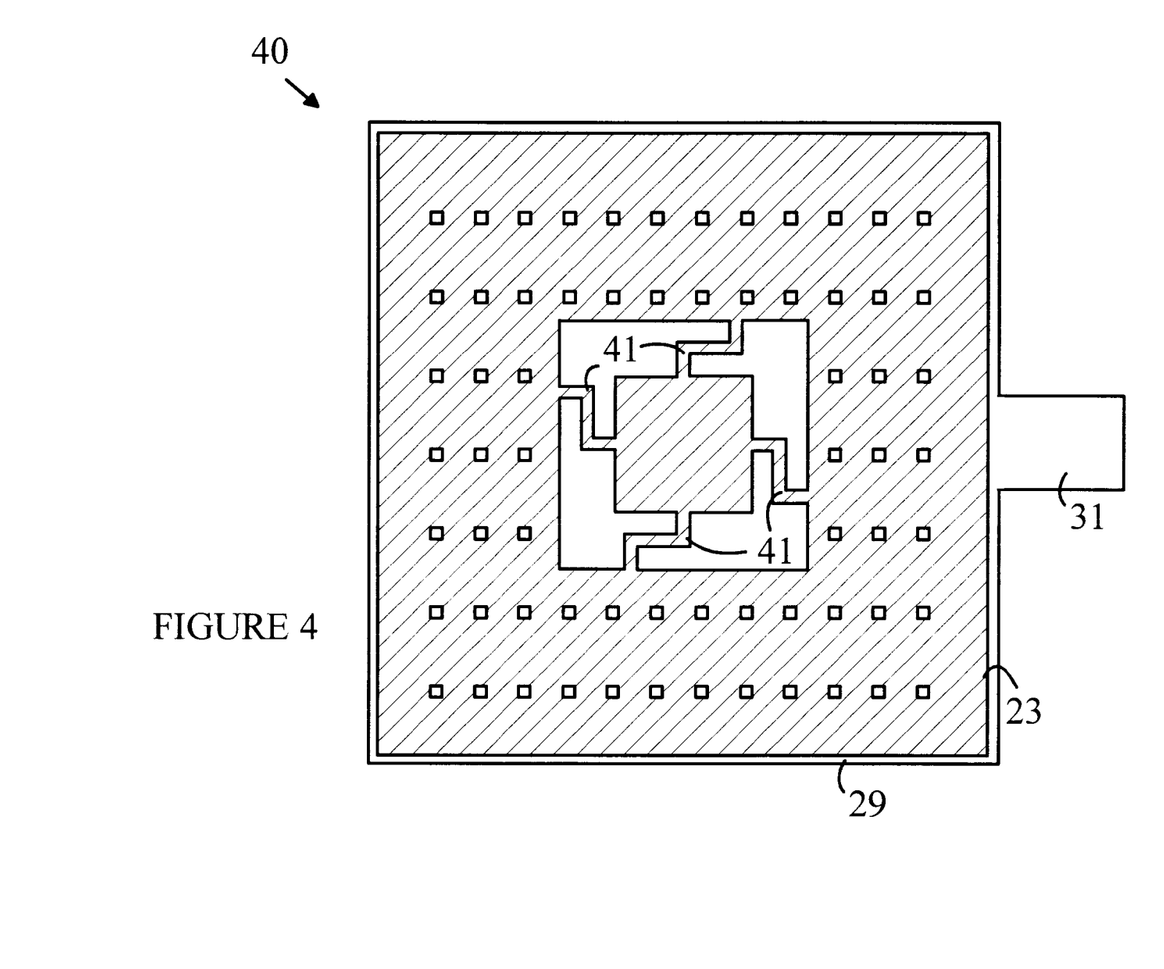
FIG. 4 is a top view of a capacitor 40 according to another embodiment of the present invention.

In the preferred embodiment of the present invention, the support, springs and top plate are all made of the same material by patterning a metal layer such that the holes shown at 34 define the springs. Hence, any change in temperature will have minimal effects on the tension in the springs because the inside dimension of the top plate expands at the same rate as the springs. However, if further stress independence is needed, the springs can be patterned such that a change in the length of the springs does not significantly change the spring constant. An embodiment of the present invention in which such springs are used is illustrated in FIG. 4, which is a top view of a capacitor 40 according to another embodiment of the present invention. To simplify the discussion, those features shown in FIG. 4 that serve the same function as features shown in FIGS. 2 and 3 have been given the same numeric designations. In capacitor 40, the springs 41 are patterned to have a "z" shape. This provides the desired stress relief.

In the embodiments discussed above the top plate also includes a plurality of holes such as hole 36 shown in FIG. 2. As will be explained in more detail below, these holes provide access to the layer under the top plate during the fabrication process such that material can be etched from under the top plate.

Figure 5:
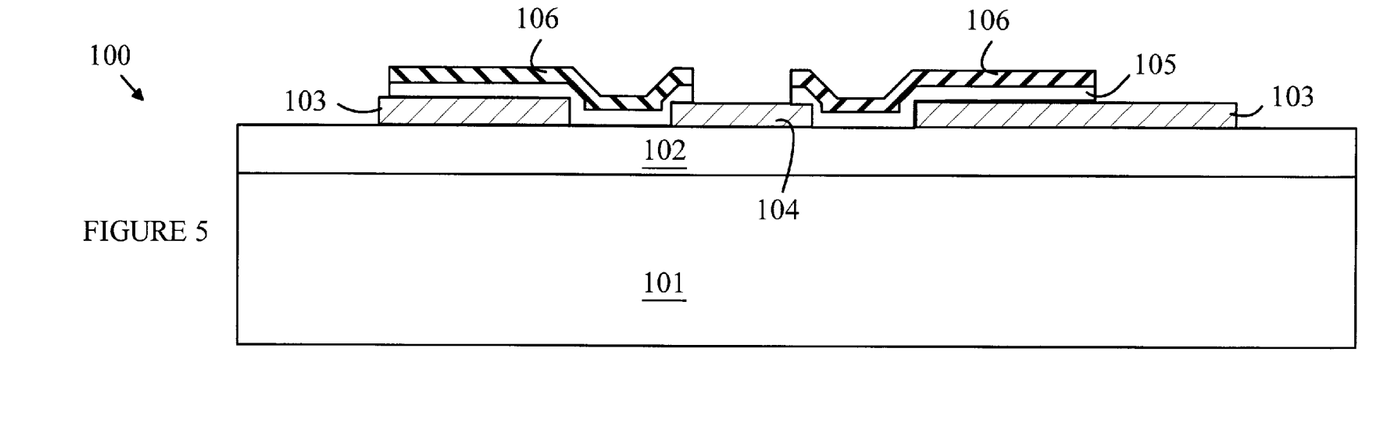
FIGS. 5–8 illustrate cross-sectional views through a capacitor 100 at various stages in the fabrication process.

The manner in which a capacitor according to the present invention is fabricated will now be explained with reference to FIGS. 5–8, which are cross-sectional views through a capacitor 100 at various stages in the fabrication process. Referring to FIG. 5, the capacitor is typically constructed on a high-resistivity silicon wafer 101 on which an isolation layer 102 has been deposited. Isolation layer 102 is preferably low-temperature oxide (LTO). Alternatively, a nonconducting substrate such as glass or plastic can be used. A gold layer is then deposited and patterned to form the bottom electrode 103 of capacitor 100 and a base 104 for the center support of the capacitor. A silicon nitride layer 105 and a phosphosilicate glass (PSG) sacrificial layer 106 are then deposited and patterned over the patterned gold layer.

Figure 6:
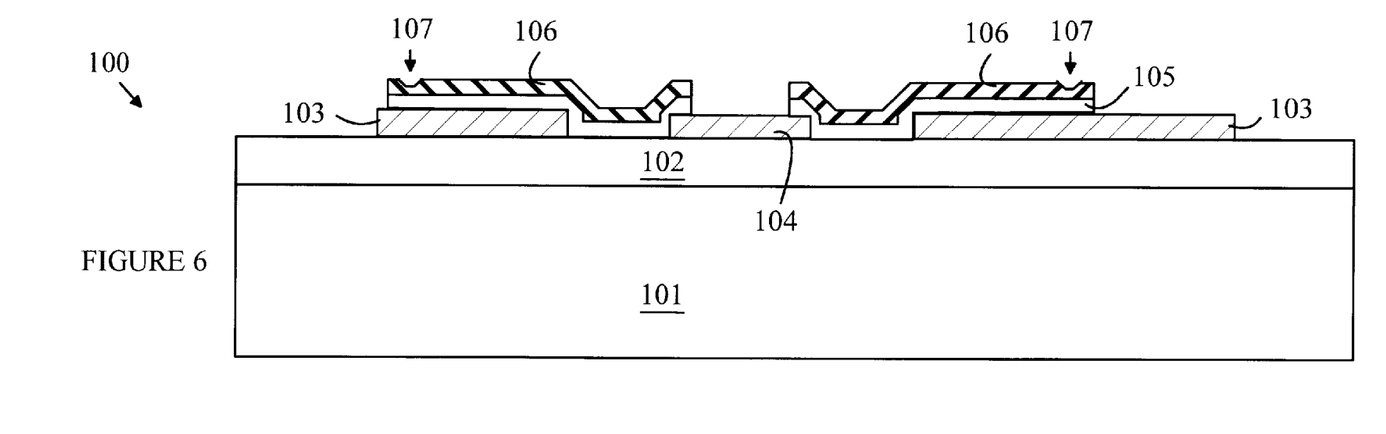
Figure 7:
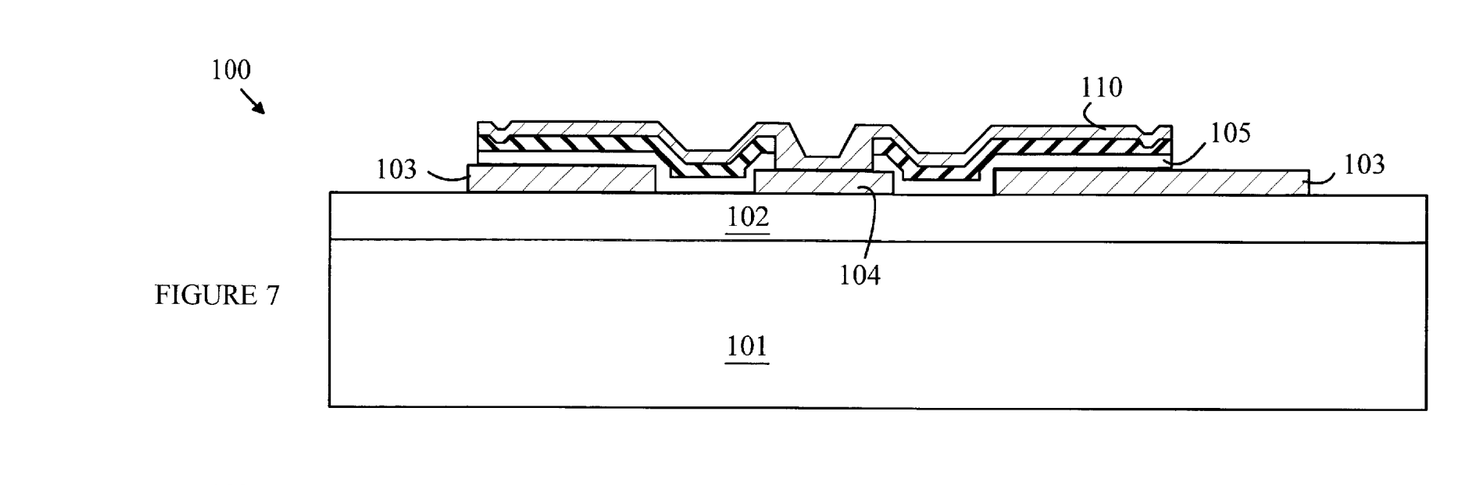
Figure 8:
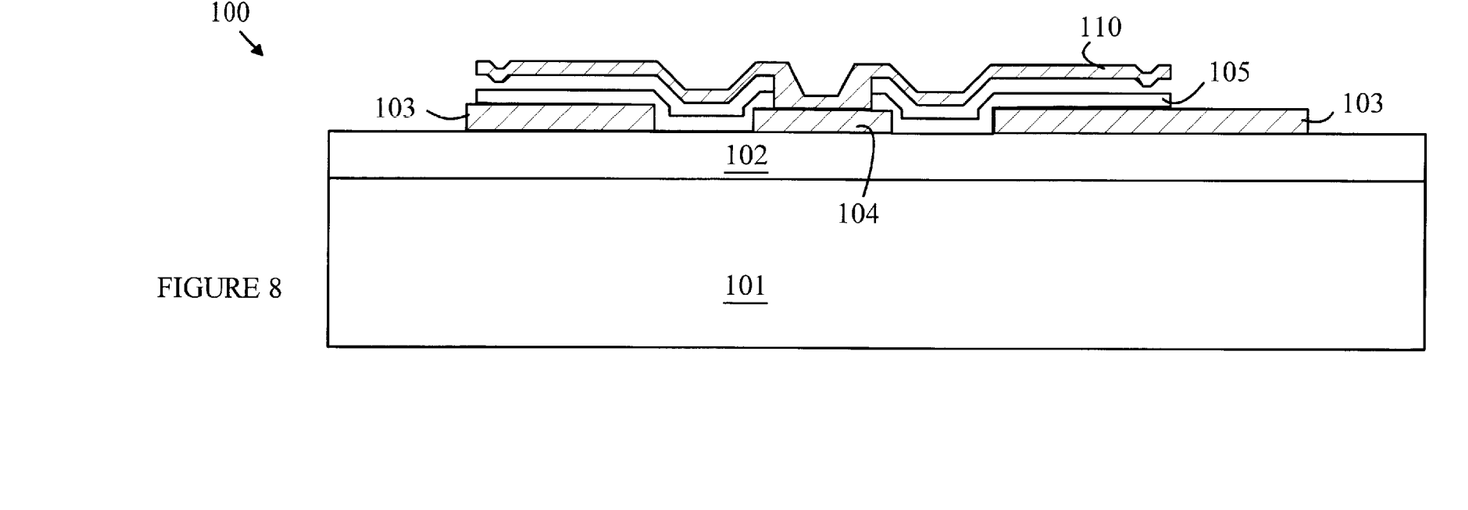

Referring to FIG. 6, sacrificial layer 106 is then selectively etched to form depressions 107. These depressions determine the shape of the protrusions 27 discussed above. A second gold layer 110 is then deposited and patterned on top of sacrificial layer 106 to form the top electrode and the remainder of the support as shown in FIG. 7. Gold layer 110 is selectively etched to form the springs and the holes. The sacrificial layer is then removed by a 10:1 BHF etch that reaches the sacrificial layer through the holes. This leaves the top plate of the capacitor suspended over the bottom electrode by the springs discussed above as shown in FIG. 8.

Figure 9:
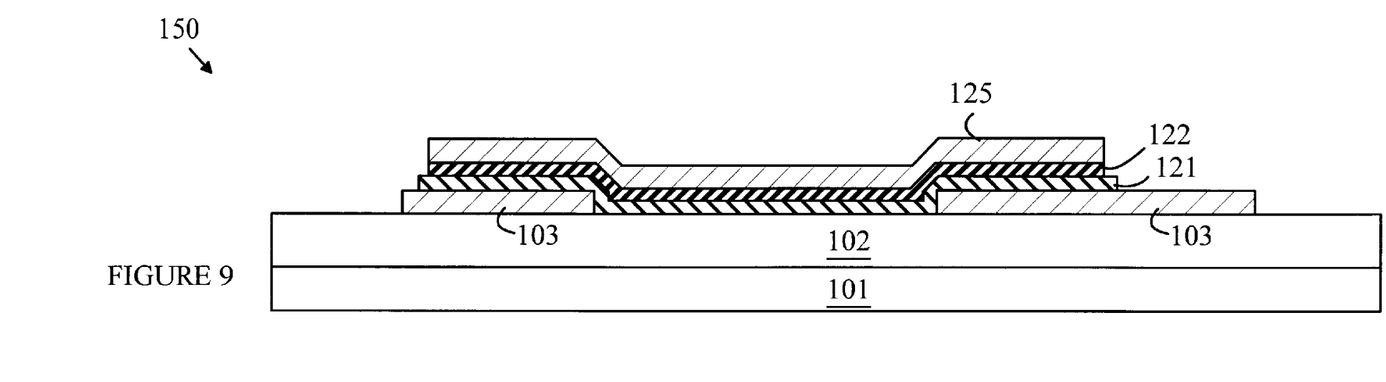
FIGS. 9 and 10 are cross-sectional views of a capacitor 150 during different stages of its construction.
Figure 10:
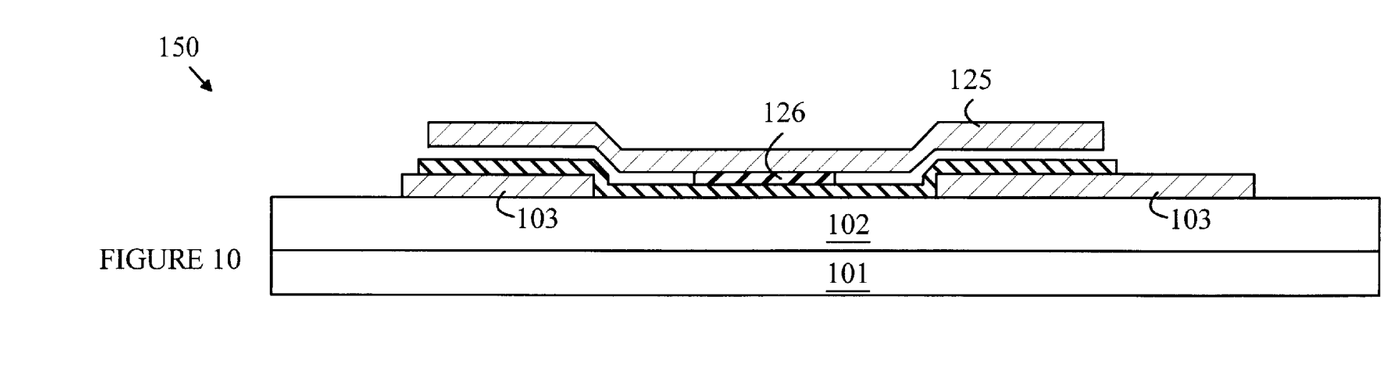

The above-described embodiments of the present invention utilize a gold support that extends to the underlying isolation layer for the top plate. However, any support structure that provides the necessary spacing between the top and bottom plates may be utilized. Refer now to FIGS. 9 and 10, which are cross-sectional views of a capacitor 150 during different stages of its construction. Capacitor 150 utilizes one of these alternative support designs.

Capacitor 150 differs from capacitor 100 discussed above in that the base 104 of the support has been omitted. Hence, the nitride layer 121 and sacrificial layer 122 extend under the central region of the top plate 125 as shown in FIG. 9. When the top plate is patterned to provide the holes that define the springs and provide the access for the etchant, no holes are provided under the central region of the top plate. Accordingly, the PSG sacrificial layer will etch much more slowly under the central region. The etch is timed such that a PSG support 126 remains under the center of top plate 125 after the PSG layer has been etched under the remainder of top plate 125 as shown in FIG. 10.

The above-described embodiments of the present invention utilize a protrusion 27 as shown in FIG. 2 in the top plate to set the minimum distance between the top and bottom plates. However, other forms of spacers may also be utilized. For example, a similar protrusion can be deposited on the bottom plate before depositing the nitride insulating layer. Similarly, an insulating "bump" can be deposited between the top and bottom plates to prevent the two plates from shorting. In this case, the nitride insulating layer can be omitted.

In the above-described embodiments of the present invention, the top plate has been assumed to be rigid with the springs providing the flexibility that allows the top plate to bend downward toward the bottom plate in response to a potential being applied between the top and bottom plates. The resultant capacitance-versus-potential curve is far from being linear. In addition, the capacitance can only be controllably increased by about 50%. This limitation is due to the electrostatic force nonlinearly increasing more rapidly than the linear restoring spring force as the top plate moves downward. When the electrostatic force exceeds the spring force, the top plate suddenly snaps down toward the bottom plate. The linearity of the capacitance curve can be increased by using a top plate that is flexible. In this case, the region of the top plate away from the springs will flex downward more than the springs alone allow, giving greater capacitance change at low voltage. After the protrusion 27 discussed above contacts the bottom plate, the rest of the top plate can continue to move downward, allowing the capacitance to continue to increase more than 50%. Hence, the dynamic range is improved. In addition, the linearity of the capacitance curve with applied voltage is also improved.

Figure 11:
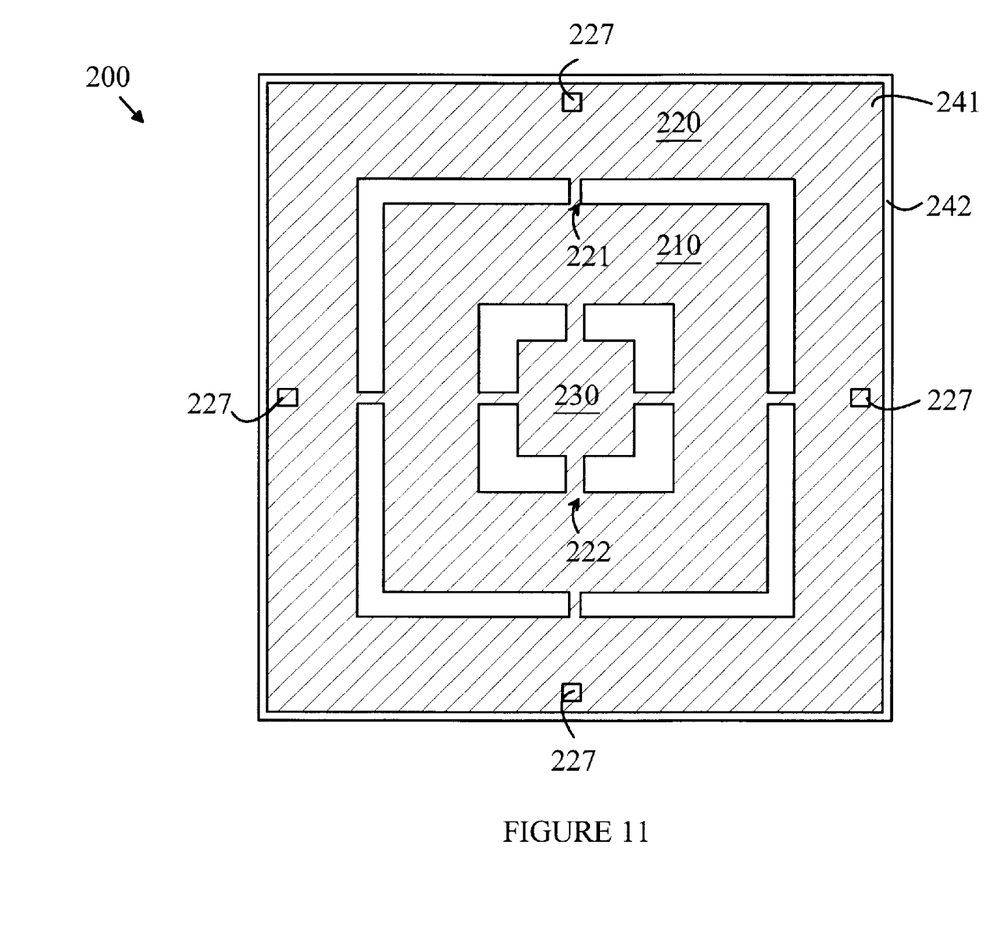
FIG. 11 is a top view of a capacitor 200 according to another embodiment of the present invention.

The flexibility of the top plate can be controlled by controlling the thickness of the material used to construct the plate. The flexibility of the top plate can also be increased by dividing the top plate into a plurality of regions that are connected to one another by springs. Such an embodiment is shown in FIG. 11, which is a top view of a capacitor 200 according to another embodiment of the present invention. To simplify the drawing, the etch holes shown in the previous embodiments have been omitted from the figure. The top plate 241 is suspended substantially at its center over the bottom plate 242 by a support 230 in a manner analogous to that discussed above. Top plate 241 is divided into two regions, 210 and 220. Region 210 is connected to the support 230 by a first set of springs of which spring 222 is typical. Region 220 is connected to region 210 by a second set of springs of which spring 221 is typical.

The degree of flexibility provided by each set of springs depends on the width and length of the springs. Hence, the manner in which the capacitance changes as a function of the applied voltage can be controlled by adjusting these dimensions.

Embodiments having more than two regions can also be constructed. By using sufficient numbers of regions and springs, the capacitance as a function of applied voltage curve can be specified over a wide range of functions.

Various modifications to the present invention will become apparent to those skilled in the art from the foregoing description and accompanying drawings. Accordingly, the present invention is to be limited solely by the scope of the following claims.

What is claimed is:

1. A capacitor comprising:
a bottom plate;
a top plate having a center portion and an outer portion;
a support connected to said center portion of said top plate for positioning said top plate over said bottom plate and separated therefrom by a gap, wherein
said outer portion of said top plate moves relative to said bottom plate when a potential is applied between said top and bottom plates.

2. A capacitor comprising:
a bottom plate;
a top plate having a center portion and an outer portion; and
a support connected to said center portion of said top plate for positioning said top plate over said bottom plate and separated therefrom by a gap, wherein
said outer portion of said top plate moves relative to said bottom plate when a potential is applied between said top and bottom plates, and
wherein said outer portion of said top plate is connected to said center portion of said top plate by a plurality of springs and wherein said movement of said top plate relative to said bottom plate is accommodated by bending at least one of said springs.

3. The capacitor of claim 1 further comprising an insulating layer between said top and bottom plates disposed so as to prevent said top plate from shorting to said bottom plate.

4. The capacitor of claim 1 further comprising a spacer for setting the minimum distance between said outer portion of said top plate and said bottom plate.

5. A capacitor comprising:
a bottom plate;
a top plate having a center portion and an outer portion;
a spacer for setting the minimum distance between said outer portion of said top plate and said bottom plate; and
a support connected to said center portion of said top plate for positioning said top plate over said bottom plate and separated therefrom by a gap, wherein
said outer portion of said top plate moves relative to said bottom plate when a potential is applied between said top and bottom plates, and
wherein said spacer comprises a protrusion on said outer portion of said top plate.

6. The capacitor of claim 2 wherein said springs are shaped to relieve thermal stress between said outer portion of said top plate and said center portion of said top plate.

7. A capacitor comprising:
a bottom plate;
a top plate having a center portion and an outer portion;
a spacer for setting the minimum distance between said outer portion of said top plate and said bottom plate; and
a support connected to said center portion of said top plate for positioning said top plate over said bottom plate and separated therefrom by a gap, wherein
said outer portion of said top plate moves relative to said bottom plate when a potential is applied between said top and bottom plates, and
wherein said outer portion of said top plate deforms when said outer portion is pressed against said spacer in response to the application of a potential difference greater than a predetermined value between said top and bottom plates.

8. A capacitor comprising:
a bottom plate;
a top plate having a center portion and an outer portion; and
a support connected to said center portion of said top plate for positioning said top plate over said bottom plate and separated therefrom by a gap, wherein
said outer portion of said top plate moves relative to said bottom plate when a potential is applied between said top and bottom plates, and
wherein said outer portion of said top plate is divided into first and second regions, said first region being connected to said second region by a spring.

9. A capacitor comprising:
a bottom plate;
a top plate having a center portion and an outer portion; and
a support connected to said center portion of said top plate for positioning said top plate over said bottom plate and separated therefrom by a gap, wherein
said outer portion of said top plate moves relative to said bottom plate when a potential is applied between said top and bottom plates, and
wherein said outer portion of said top plate is sufficiently flexible to bend toward said bottom plate when said potential is applied between said top and bottom plates.

* * * * *